No. 895,675. PATENTED AUG. 11, 1908.
N. H. PEPPLER.
VELOCIPEDE.
APPLICATION FILED OCT. 21, 1907.
4 SHEETS—SHEET 2.
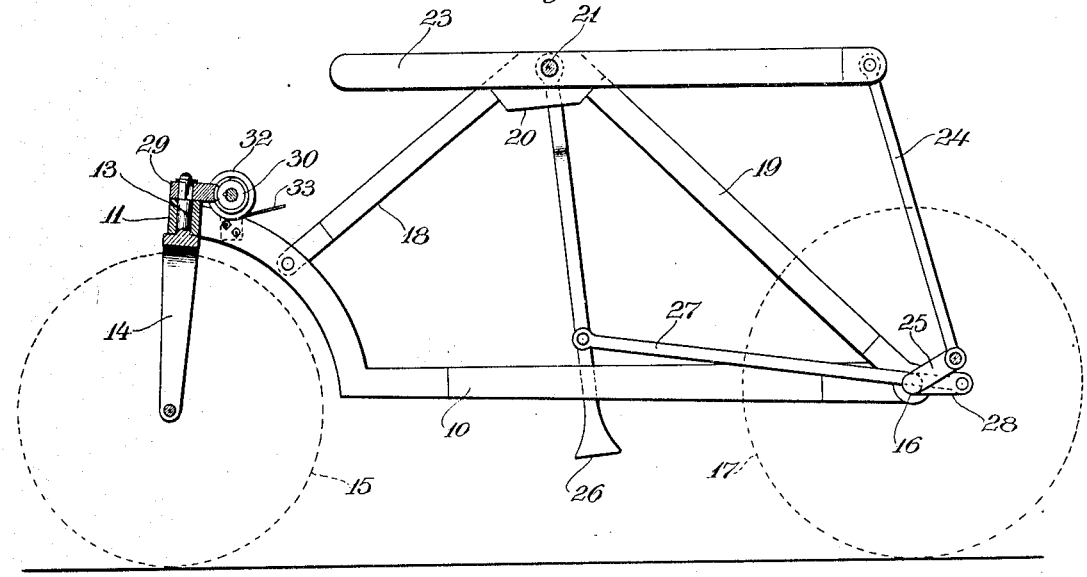
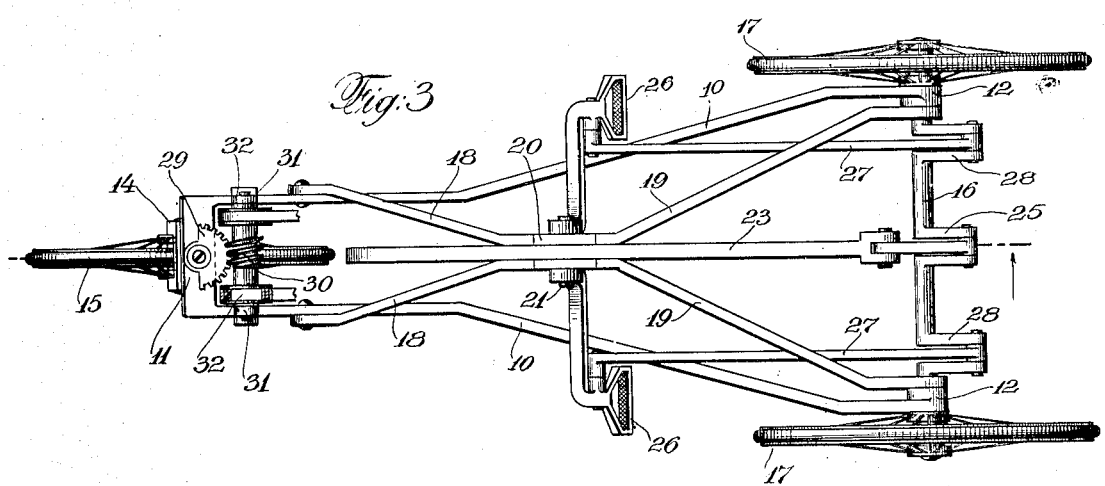
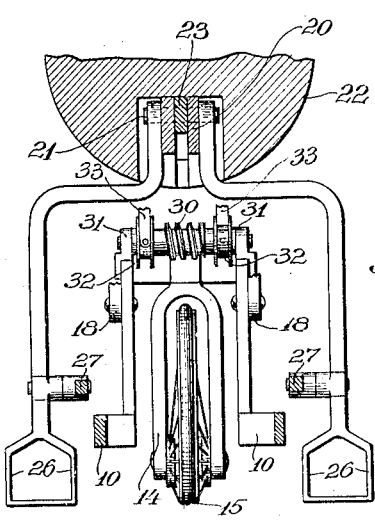
Witnesses:
A. Newcomb
M. Reiners
Inventor
Nelson H. Peppler,
By his Attorneys
Prindle and Williamson.

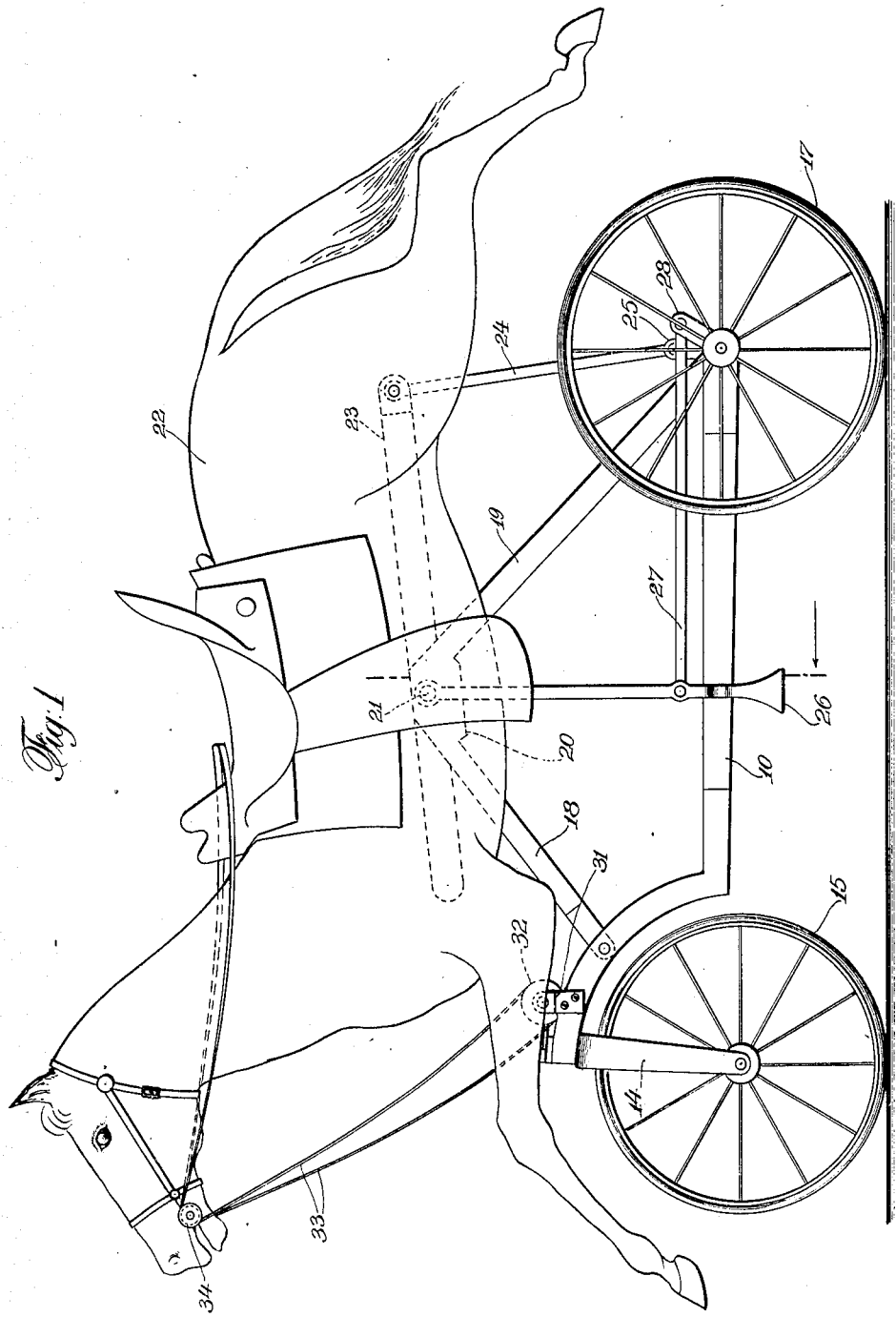

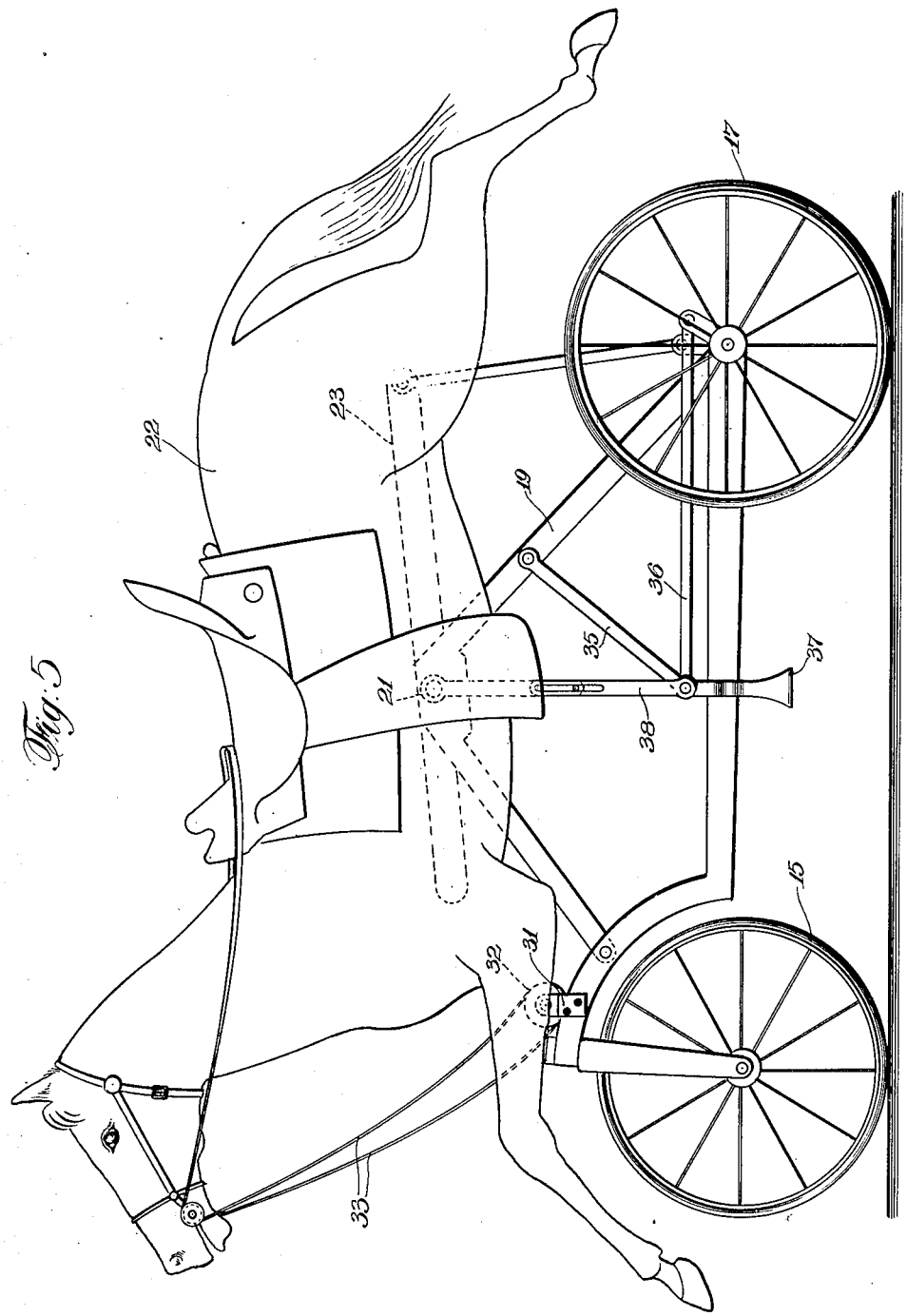

No. 895,675. PATENTED AUG. 11, 1908.
N. H. PEPPLER.
VELOCIPEDE.
APPLICATION FILED OCT. 21, 1907.

4 SHEETS—SHEET 4.

Witnesses:
A. Newcomb
M. Reiners

Inventor
Nelson H. Peppler,
By his Attorneys
Prindle and Williamson

UNITED STATES PATENT OFFICE.

NELSON H. PEPPLER, OF NEW YORK, N. Y.

VELOCIPEDE.

No. 895,675.　　　　Specification of Letters Patent.　　Patented Aug. 11, 1908.

Application filed October 21, 1907. Serial No. 398,474.

To all whom it may concern:

Be it known that I, NELSON H. PEPPLER, of New York, in the county of New York, and in the State of New York, have invented certain new and useful Improvements in Velocipedes, and do hereby declare that the following is a full, clear, and exact description thereof, reference being had to the accompanying drawings, in which—

Figure 6:
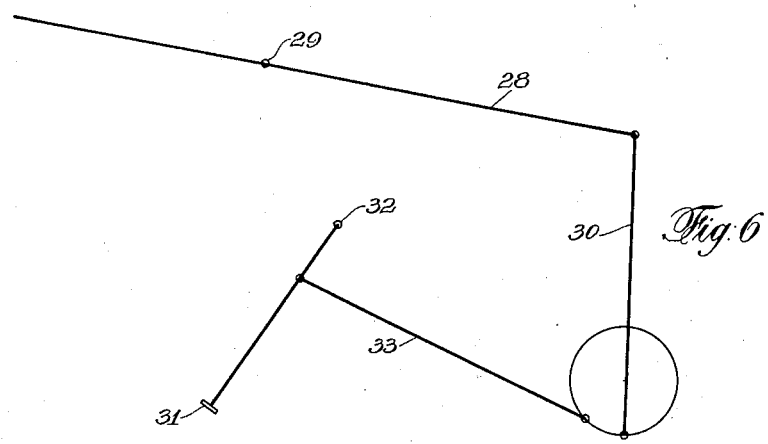
Figure 7:
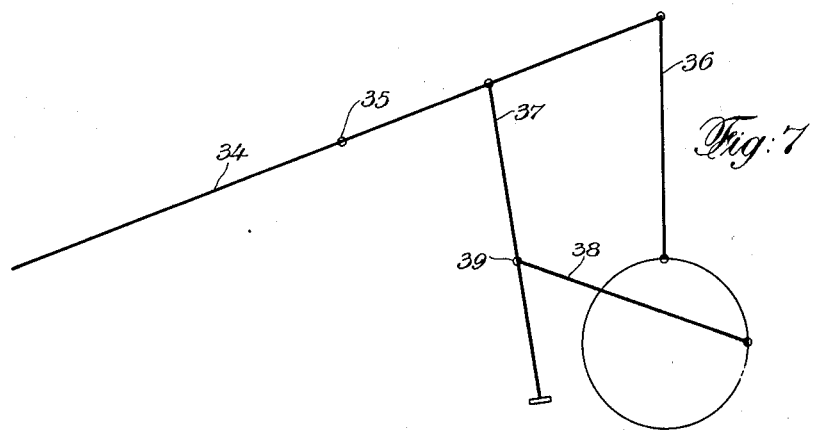
Figure 8:
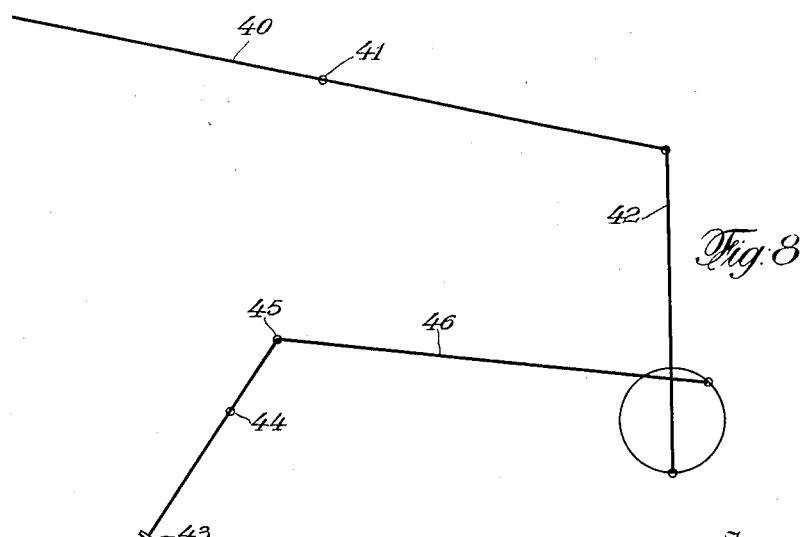

Figure 1 is a side elevation of a velocipede embodying my invention; Figs. 2, 3 and 4 are details of the mechanism illustrated in Fig. 1; Fig. 5 illustrates another embodiment of my invention, and Figs. 6, 7 and 8 are diagrammatic views of other embodiments of that feature of my invention for overcoming the dead center.

The object of my invention has been to provide a velocipede to resemble a running horse or other running animal so that a child may sit upon the horse and travel over the ground, and the sensation of riding a real horse be quite accurately reproduced; and to such ends my invention consists in the velocipede hereinafter specified.

The particular objects of my invention have been: first, to produce a velocipede of the class referred to which shall be easy to propel by the avoidance of all dead centers; second, to provide a convenient steering device which is operated by reins in the same manner as a horse is guided; and third, to attain such simplicity that the velocipede is thoroughly practical.

In that form of my invention illustrated in Figs. 1 to 4, I provide a frame consisting of reach bars 10 that carry at their forward ends a head 11 having within it a vertical bearing, and at their rearward ends bearings 12 having a horizontal axle. A stem 13 is mounted in the bearing 11, and carries at its lower end a fork 14 in which is journaled a steering wheel 15, much in the same manner as with a bicycle. A rear axle 16 is mounted in the bearings 12 and has fixed upon its outer ends wheels 17. Braces 18 and 19 rise from the front and rear ends of the reach bars and support a transverse horizontal bearing 20, in which is mounted a pin 21. The body 22 of the horse is pivoted upon the pin 21, the said body being preferably supported upon a frame 23 pivoted upon the said pin. The frame 23 is connected by a connecting rod 24 with a crank 25 formed on the rear axle 16. The feet of the rider are supported upon stirrups 26, which are, in the present form of my invention, hung from the pivot pin 21, the said stirrups being formed of rigid material such as steel bars. Connecting rods 27 connect the lower portion of the stirrups 26 with a second crank 28 also formed on the rear axle 16.

A worm wheel 29 is secured to the upper end of the stem 13, and is engaged by a worm 30 journaled in a bracket 31 that is carried by the reach bars. Each end of the worm shaft has a pulley 32 thereon, to which one end of a rein 33 is fastened, the reins passing through pulleys 34 on the ends of a bit in the horse's mouth.

In riding the above-described embodiment of my invention, the rider of course sits upon the horse with his feet in the stirrups. The rider rocks his body forward and back, in imitation of the motion in riding an actual horse, and at the same time causes a swinging motion of the stirrups. The shifting weight of the rider along the horse causes the body of the horse to oscillate upon the pivot 21, through the connecting rod 24, to turn the cranked rear axle and propel the velocipede. If, however, the crank 25 stops on a dead center, that is, if the crank and its connecting rod tend to stop in line with each other, the forward and backward pressure upon the stirrup from the rider's feet will act upon the crank 28, the latter being preferably set at a different angle from the crank 25, and will throw the crank 25 off the dead center. The two cranks can be in line with each other, or a single crank can be substituted for the two if desired, since the connecting rods 24 and 27 operate from different directions.

In order to steer the velocipede it is only necessary to pull one rein or the other when the worm will be revolved in one direction or the other, the opposite ends of the reins being oppositely wound upon their respective pulleys, and the front wheel will be turned through the action of the worm on the worm wheel. While this arrangement provides a very convenient means of steering, the front wheel cannot turn except through the action of the reins, because the worm will prevent the worm wheel from turning.

In that form of my invention which is illustrated in Fig. 5, there are a real and a false stirrup. The real stirrup consists of a bar 35 which is pivoted at a point to the rear of the pivot 21, either upon the frame 23, or, as I prefer, upon the brace 19. The bar extends straight to the point of connection with its connecting rod 36, and then extends vertically to the foot-rest 37. The false stirrup consists either of a telescopic bar 38 attached to the side of the horse and pivoted to the foot-rest, or of a stirrup of leather or other flexible material in place of such telescopic bar. The form of stirrup connection illustrated in Fig. 5 affords a better means of applying power to the crank shaft than that illustrated in Figs. 1 to 4, because in the form of Fig. 5 the mere weight of the rider on the stirrup tends to swing the real stirrup into a vertical line and therefore exerts a horizontal pressure upon the connecting rod, while in the form in Figs. 1 to 4, the rider can only exert a forward or back pressure upon the stirrup and his weight is not of assistance to him.

It will be observed that I have provided a comparatively simple velocipede by which a very realistic imitation of actually riding a horse can be secured.

It is obvious that various changes can be made in the above-described construction which will be within the scope of my invention; for instance, the crank shaft instead of directly carrying the driving wheels can be geared to a shaft which carries the driving wheels, either by tooth gearing or sprocket gearing, so that the rear wheels may revolve more than once for a single revolution of the crank shaft. Other forms of connection between the stirrups and the crank shaft can be provided for the purpose of preventing a dead center.

In Figs. 6, 7 and 8 are illustrated diagrammatically other embodiments of that feature of my invention for overcoming the dead center. In Fig. 6 the horse body is represented by the line 28 and its fulcrum by the point 29. A connecting rod 30 extends from the horse to the crank shaft. The pedal 31 swings from a fixed pivot 32 on the frame and has a connecting rod 33 connected between the pivot and pedal with the crank shaft. The two cranks are preferably 45 degrees apart.

In Fig. 7 the horse body is represented by the line 34 and swings on a pivot 35 and as before has a connecting rod 36 extending to the crank shaft. The stirrup 37 is pivoted to the horse body, and at an intermediate point between the foot-rest and the horse body has a connecting rod 38. The cranks are here shown as at 90 degrees. In this construction the lifting of the horse body carries upward with it the treadle, and lifts the pivot 39 between the connecting rod 38 and the stirrup so that the connecting rod 38 rises bodily with the horse body and thus helps to avoid a dead center. Likewise when the rear end of the body goes below the horizontal, it carries the pivot 39 down below the center so that again the avoidance of a dead center is helped by the swinging of the horse body.

In Fig. 8 the line 40 swinging on the pivot 41 again represents the horse body, and a rod 42 connects the horse body with the crank shaft. The treadle 43 swings on a fixed pivot 44, and above said pivot is a pivot 45 connecting it with a connecting rod 46 extending to the crank shaft.

I claim:

1. In a velocipede, the combination of a wheeled frame, an animal pivoted thereon, a connecting rod pivoted to said animal, a crank driven by said connecting rod, said crank being connected to a wheel on the frame, and a device for overcoming the dead center of said crank.

2. In a velocipede, the combination of a wheeled frame, an animal pivoted thereon, a connecting rod pivoted to said animal, a crank driven by said connecting rod, said crank being connected to a wheel on the frame, and a device operated by a movement substantially transverse to the movement of said crank for overcoming the dead center of said crank.

3. In a velocipede, the combination of a wheeled frame, an animal pivoted upon said frame, a connecting rod driven by the oscillation of said animal, a crank to which said connecting rod is pivoted, said crank being connected to a wheel of said frame, stirrups, and a connection between said stirrups and said crank for overcoming the dead center of the latter.

4. In a velocipede, the combination of a wheeled frame, an animal whose body is pivoted thereon, a connecting rod pivoted to the body of said animal, a crank to which said connecting rod is pivoted, pivoted stirrups, and a connecting rod attached at one end to said stirrups and connected at its opposite end to said crank to overcome its dead center.

5. In a velocipede, the combination of a wheeled frame, an animal whose body is pivoted thereon, a connecting rod pivoted to said body, a crank connected to said wheels and having said connecting rod pivoted thereto, stirrups pivoted at a point above the axis of said crank and to the rear of the pivot of said body, and a connection between said stirrups and said crank for overcoming dead centers.

6. In a velocipede, the combination of a wheeled frame, an animal whose body is pivoted thereon, a connecting rod and crank, the former being pivoted to the body and the latter connected with a wheel of said frame, and stirrups so connected with said crank that the weight of the rider upon said stirrups shall overcome the dead center of the crank.

7. In a velocipede, the combination of a wheeled frame, an animal whose body is pivoted on said frame, a connecting rod and crank, said rod being pivoted to the body and said crank being connected to a wheel of said frame, a real stirrup pivoted at the rear of the pivot of the body and above the axis of the crank, and a false stirrup connected with the real stirrup and the body of the animal at a point substantially above the footrest of the stirrup.

8. In a velocipede, the combination of a wheeled fame, an animal whose body is pivoted on said frame, a connecting rod and crank, said rod being pivoted to the body and said crank being connected to a wheel of said frame, a real stirrup pivoted at the rear of the pivot of the body and above the axis of the crank, and a false stirrup connected with the real stirrup and the body of the animal at a point substantially above the footrest of the stirrup, said false stirrup consisting of two bars slidably connected together.

9. In a vehicle, the combination of a wheeled frame, steering means, gearing for driving the wheels, which gearing has a dead center, and means independent of said steering means and independent of said gearing for overcoming the dead center.

10. In a velocipede, the combination of a wheeled frame, an animal whose body is pivoted thereon, a connection between the animal and the wheels for driving the latter, which connection has a dead center, stirrups, and a connection between the stirrups and the wheels for overcoming the dead center.

11. In a velocipede, the combination of a wheeled frame, an animal whose body is pivoted thereon, a connection between the body and the wheels for driving the latter, said connection having a dead center, and stirrups so connected with said crank that the weight of the rider upon said stirrups shall overcome the dead center of the crank.

12. In a velocipede, the combination of a wheeled frame, an animal whose body is pivoted thereon, gearing for driving the wheels by the oscillation of said body, stirrups and independent gearing for driving the wheels from said stirrups.

In testimony that I claim the foregoing I have hereunto set my hand.

NELSON H. PEPPLER.

Witnesses:
    EDWIN J. PRINDLE,
    A. NEWCOMB.